(12) United States Patent
Doan et al.

(10) Patent No.: US 10,956,450 B2
(45) Date of Patent: Mar. 23, 2021

(54) DENSE SUBSET CLUSTERING

(71) Applicant: salesforce.com, inc., San Francisco, CA (US)

(72) Inventors: Dai Duong Doan, Alameda, CA (US); Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 502 days.

(21) Appl. No.: 15/082,267

(22) Filed: Mar. 28, 2016

(65) Prior Publication Data

US 2017/0277768 A1 Sep. 28, 2017

(51) Int. Cl.
*G06F 16/28* (2019.01)
*G06F 16/22* (2019.01)
*G06F 16/2457* (2019.01)

(52) U.S. Cl.
CPC ........ *G06F 16/285* (2019.01); *G06F 16/2246* (2019.01); *G06F 16/24578* (2019.01); *G06F 16/287* (2019.01); *G06F 16/24575* (2019.01)

(58) Field of Classification Search
CPC ......... G06F 17/30651; G06F 17/30696; G06F 16/3328; G06F 16/287; G06F 16/24575
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,819,258 A | 10/1998 | Vaithyanathan et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Lee et al., "Managing and Mining Graph Data, Advances in Database Systems, Chapter 10—A Survey of Algorithms for Dense Subgraph Discovery", 2010, Springer, DOI 10.1007/978-1-4419-6045-0_10. (Year: 2010).*

(Continued)

*Primary Examiner* — Sheryl L Holland
(74) *Attorney, Agent, or Firm* — Dergosits & Noah LLP; Todd A. Noah

(57) ABSTRACT

Some embodiments of the present invention include a method for determining a dense subset from a group of records using a graphical representation of the group of records, the graphical representation having nodes and edges, a node associated with a record from the group of records, an edge connecting two nodes associated with two related records, wherein a node is associated with a weight corresponding to a number of edges connected to the node, wherein a record is added to the dense subset based on its associated node having a highest weight and a density that satisfies a density threshold, the density being based on the content of the dense subset, and wherein the content of the dense subset is to be processed as including duplicate records.

24 Claims, 18 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,523,019 B1 | 2/2003 | Borthwick |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,814,272 B2 | 10/2010 | Barrall et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,836,524 B2 | 12/2017 | Bayliss |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0126102 A1 | 7/2003 | Borthwick |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0107189 A1 | 6/2004 | Burdick et al. |
| 2004/0107205 A1 | 6/2004 | Burdick et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0106847 A1* | 5/2006 | Eckardt, III ...... G06F 17/30696 |
| 2007/0226200 A1 | 9/2007 | Hays et al. |
| 2008/0010605 A1* | 1/2008 | Frank ................ G06F 17/30241 |
| | | 715/765 |
| 2009/0043797 A1 | 2/2009 | Dorie et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0005048 A1 | 1/2010 | Bodapati et al. |
| 2010/0106724 A1 | 4/2010 | Anderson |
| 2011/0276509 A1* | 11/2011 | Varadarajan ........... G06Q 10/00 |
| | | 705/326 |
| 2012/0023107 A1 | 1/2012 | Nachnani et al. |
| 2012/0233137 A1 | 9/2012 | Jakobson et al. |
| 2013/0054541 A1 | 2/2013 | Kaldas et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0226840 A1* | 8/2013 | Zhang ............... G06F 17/30958 |
| | | 706/12 |
| 2013/0332447 A1 | 12/2013 | Bemier |
| 2014/0047091 A1* | 2/2014 | Aggarwal ............... H04L 45/46 |
| | | 709/223 |
| 2014/0118355 A1* | 5/2014 | Vassilvitskii ....... G06F 16/9024 |
| | | 345/440 |
| 2014/0188564 A1 | 7/2014 | Ghatti et al. |
| 2014/0198986 A1* | 7/2014 | Marchesotti ....... G06K 9/00684 |
| | | 382/190 |
| 2014/0214936 A1* | 7/2014 | Abraham ................ H04W 4/21 |
| | | 709/204 |
| 2014/0244300 A1 | 8/2014 | Bess et al. |
| 2014/0359537 A1 | 12/2014 | Jakobson et al. |

(56) References Cited

U.S. PATENT DOCUMENTS

| | | |
|---|---|---|
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0199363 A1 | 7/2015 | Morton et al. |
| 2016/0004963 A1* | 1/2016 | Hasegawa ............. G06N 3/088 706/25 |
| 2016/0085527 A1* | 3/2016 | de Lima Ottoni .. G06F 16/9024 717/157 |
| 2017/0161329 A1 | 6/2017 | Chambliss et al. |
| 2017/0169174 A1* | 6/2017 | Yeung ............. G06F 17/30958 |
| 2017/0262586 A1 | 9/2017 | Bess et al. |

OTHER PUBLICATIONS

Reid et al., "Finding Dense Subgraphs with Size Bounds", 2009, Springer-Verlag. (Year: 2009).*

Tsourakakis et al., "The K-clique Densest Subgraph Problem", May 22, 2015, International World Wide Web Conference Committee, ACM. (Year: 2015).*

E. Georgii, "Structural and Relational Data Mining for Systems Biology Applications", 2010, Dissertation Eberhard-Karls University, Tubingen, Germany. (Year: 2010).*

Hassanzadeh et al., "Framework for Evaluating Clustering Algorithms in Duplicate Detection", 2009, ACM. (Year: 2009).*

Subramani et al., "Density-based community detection in social networks", 2011, IEEE. (Year: 2011).*

U.S. Appl. No. 13/986,251, filed Apr. 16, 2013.

\* cited by examiner

| Node | Record | Weight |
|------|--------|--------|
| 684  | C      | 4      |
| 691  | E      | 3      |
| 689  | F      | 3      |
| 682  | B      | 2      |
| 686  | D      | 2      |
| 680  | A      | 2      |

*FIG. 6B*

| Node | Record | Weight |
|------|--------|--------|
| 682 | B | 2 |
| 686 | D | 2 |
| 680 | A | 2 |

| Record | Node | Density | Weight |
|---|---|---|---|
| E | 691 | 100% | 4 |
| F | 689 | 100% | 3 |
| D | 686 | 100% | 2 |
| B | 682 | 100% | 2 |
| A | 680 | 0% | 2 |

*FIG. 6E*

| Record | Node | Density | Weight |
|---|---|---|---|
| F | 689 | 100% | 3 |
| D | 686 | 100% | 2 |
| B | 682 | 50% | 2 |
| A | 680 | 0% | 2 |

*FIG. 6F*

| Record | Node | Density | Weight |
|---|---|---|---|
| D | 686 | 66.7% | 2 |
| B | 682 | 33% | 2 |
| A | 680 | 33% | 2 |

*FIG. 6G*

| Record | Node | Density | Weight |
|---|---|---|---|
| B | 682 | 25% | 2 |
| A | 680 | 25% | 2 |

*Fig. 6H*

| Record | Node | Density | Weight |
|---|---|---|---|
| E | 691 | 100% | 4 |
| F | 689 | 100% | 3 |
| D | 686 | 100% | 3 |
| B | 682 | 100% | 2 |
| A | 680 | 0% | 4 |

*FIG. 6J*

| Record | Node | Density | Weight |
|---|---|---|---|
| F | 689 | 100% | 3 |
| D | 686 | 100% | 3 |
| B | 682 | 50% | 2 |
| A | 680 | 50% | 4 |

*FIG. 6K*

| Record | Node | Density | Weight |
|---|---|---|---|
| D | 686 | 66.7% | 3 |
| B | 682 | 33% | 2 |
| A | 680 | 66.7% | 4 |

*FIG. 6L*

| Record | Node | Density | Weight |
|---|---|---|---|
| D | 686 | 75% | 3 |
| B | 682 | 50% | 2 |

*FIG. 6M*

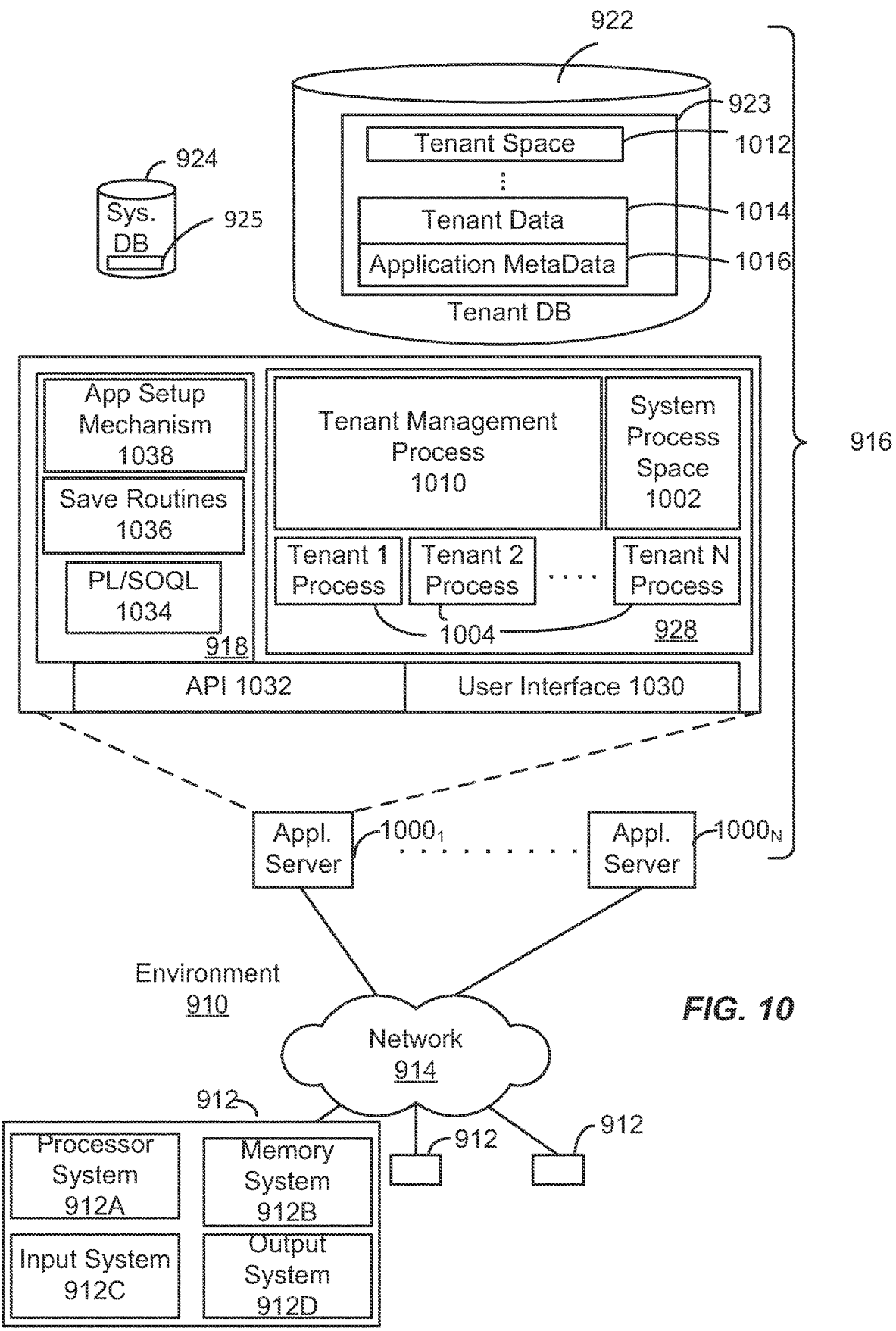

DENSE SUBSET CLUSTERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves copyright rights whatsoever.

TECHNICAL FIELD

The present disclosure relates generally to data processing and more specifically relates to identifying related information.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Database systems may include databases that have millions of records. To maintain the efficiency and integrity of the databases, searches may be performed to identify and remove duplicate records. Comparison of records against all the other records one-by-one to determine duplication may be significantly time consuming and computing intensive. As such, database designers continuously try to develop techniques that can improve the performance of the database by identifying related or duplicated records.

BRIEF SUMMARY

For some embodiments, methods and systems for identifying duplicate records in a database system may include for determining a dense subset from a group of records using a graph representation of the group of records, the graph representation having nodes and edges, a node associated with a record from the group of records, an edge connecting two nodes associated with two related records, wherein a node is associated with a weight corresponding to a number of edges connected to the node, wherein a record is added to the dense subset based on its associated node having a highest weight and a density that satisfies a density threshold, the density being based on the content of the dense subset, and wherein the content of the dense subset is to be processed as including duplicate records. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 6B shows an example weight table that includes information about the nodes of the graph in FIG. 6A, in accordance with some embodiments.

FIG. 6E shows an example density table that includes information about the nodes in the graph and their corresponding densities and weights, in accordance with some embodiments.

FIG. 6F shows an example updated density table after a record is added to a dense subset, in accordance with some embodiments.

FIG. 6G shows another updated density table after a record is added to the dense subset, in accordance with some embodiments.

FIG. 6H shows another updated density table after a record is added to the dense subset, in accordance with some embodiments.

FIG. 6J shows an example density table that includes information about the nodes in the graph of FIG. 6I, in accordance with some embodiments.

FIG. 6K shows an updated density table after a record is added to the dense subset, in accordance with some embodiments.

FIG. 6L shows an example of another updated density table after a record is added to the dense subset, in accordance with some embodiments.

FIG. 6M shows another updated density table after a record is added to the dense subset, in accordance with some embodiments.

FIG. 10 shows a system diagram further illustrating the architecture of a multi-tenant database environment, in accordance with some embodiments.

DETAILED DESCRIPTION

Figure 1:
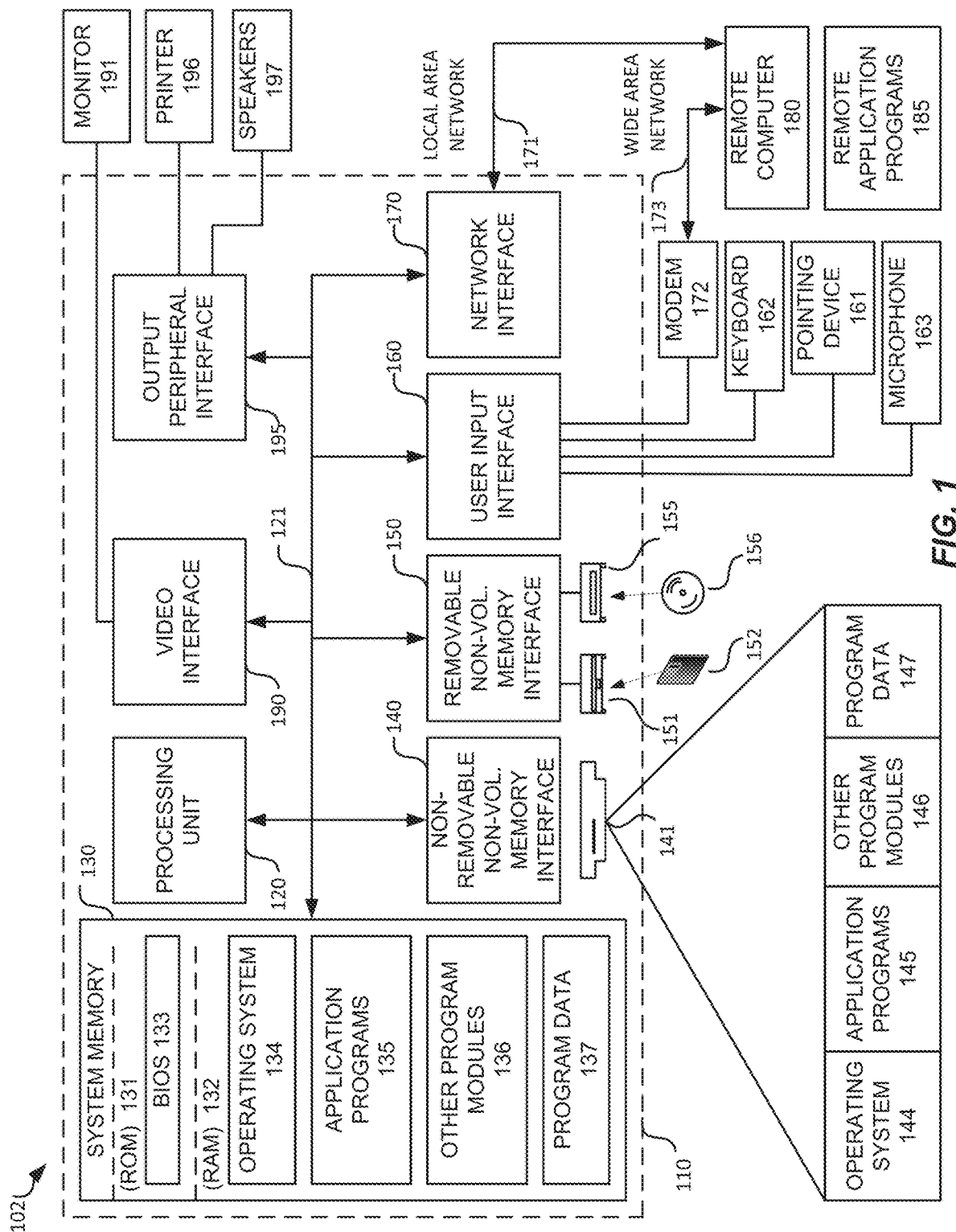
FIG. 1 shows a diagram of an example computing system that may be used with some embodiments.

Applications of systems and methods for identifying duplicate records in a group of records using dense subsets will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, businesses use a CRM (Customer Relationship Management) system (also referred to as a database system or system) to manage business relationships and information associated with the business relationship. For example, this may include customer and prospect contact information, accounts, leads, and opportunities in one central location. The information may be stored in a database as objects. For example, the CRM system may include "account" object, "contact" object and "opportunities" object.

The "account" object may include information about an organization or person (such as customers, competitors, and partners) involved with a particular business. The "contact" object may include contact information, where each contact may be an individual associated with an "account". The "opportunities" object includes information about a sale or a pending deal. Each object may be associated with fields. For example, the "accounts" object may include fields such as "company", "zip", "phone number", "email address", etc. The "contact" object may include fields such as "first name", "last name", "phone number", "accountID", etc. The "accountID" field of the "contact" object may be the ID of the account that is the parent of the contact. The "opportunity" object may include fields such as "amount", "accountID", etc. The "accountID" field of the "opportunity" object may be the ID of the account that is associated with the opportunity. Each field may be associated with a field value. For example, a field value for the "zip" field may be "94105".

There may be millions of records (e.g., individual contacts) in an object (e.g., contact object). When a new contact is inserted into the contact object, a match rule (or matching rule) may be applied to identify duplicate contacts. A match rule may use criteria to determine how closely a field on a new or edited record matches the same field on an existing record, and, ultimately, whether the two records match. A match key may be used by a match rule to quickly return a list of possible duplicates. The match key may be based on one or more fields. For example, a match key that is based on a "company" field and a "zip" field in an "accounts" object may be "company (2,6) zip (1,3)" with the numbers inside the brackets referring to number of tokens and number of characters per token.

Before the match keys are applied to any objects, the field values of those objects may be normalized. For example, if the object includes the field "company", then the normalization for the field "company" may include expanding the acronyms, having the first letter of each word be in lowercases, removing the suffices such as "Corporation", "Incorporated", "Inc", "Limited", "Ltd.", etc., and removing the stop words such as "and", "the", "of". Using this normalization example, the field value "Intel Corp." is normalized to become "intel", and the field value "IBM" is normalized to become "international business machine".

After the field values are normalized, some standard or pre-defined match keys are automatically applied when the match rule is activated. An example of a pre-defined match key is "company (2, 6) zip (1, 3)" that is applied to the "account" object. For example, if the company name is "salesforce.com", then applying the first portion "company (2, 6)" of the match key results in the string "salesf", and if the company zip code is "94105-5188", then applying the second portion "zip (1, 3)" of the match key results in the string "941". The resulting key is therefore "salesf941". The process of applying the standard match keys may be referred to as indexing.

When the match rule is activated, the match key is automatically applied to all existing records so that when the match rule runs, the database system can look for duplicate candidates among records with the same key. For example, when the above example match key is applied to the "company" and "zip" fields, the key "sales941" is generated to match duplicate records having the same value in the "company" and "zip" fields. Using the match key to identify duplicate candidates can prevent users from saving duplicate records based on the value of one or more fields.

Using match rules to identify duplicate candidates may be applicable when adding a new record or an edited record into an object to determine how closely a field on the new or edited record matches the same field on an existing record and whether the two records match. However, this approach may not be applicable when an organization has millions of records that need to be processed to remove duplicate records (also referred to as de-duplication or de-dupe). The identification of the duplicate records can be challenging and may significantly affect the performance of the CRM system. As will be described, the millions of records may need to be grouped or clustered into dense subsets of fewer of records to enable faster and more efficient identification and removal of the duplicate records.

The disclosed embodiments may include systems and methods for identifying duplicate records in a group of records in a database system and may include determining a dense subset from a group of records using a graph representation of the group of records, the graph representation having nodes and edges, a node associated with a record from the group of records, an edge connecting two nodes associated with two related records, wherein a node is associated with a weight corresponding to a number of edges connected to the node, wherein a record is added to the dense subset based on its associated node having a highest weight and a density that satisfies a density threshold, the density being based on the content of the dense subset, and wherein the content of the dense subset is to be processed as including duplicate records.

The disclosed embodiments may include an apparatus for identifying duplicate records and include one or more processors and a non-transitory computer readable medium storing a plurality of instructions, which when executed, cause the one or more processors to determine a dense subset from a group of records using a graph representation of the group of records, the graph representation having nodes and edges, a node associated with a record from the group of records, an edge connecting two nodes associated with two related records, wherein a node is associated with a weight corresponding to a number of edges connected to the node, wherein a record is added to the dense subset based on its associated node having a highest weight and a density that satisfies a density threshold, the density being based on the content of the dense subset, and wherein the content of the dense subset is to be processed as including duplicate records.

The disclosed embodiments may include a computer program product comprising computer-readable program code to be executed by one or more processors when retrieved from a non-transitory computer-readable medium, the program code including instructions to determine a dense subset from a group of records using a graph representation of the group of records, the graph representation having nodes and edges, a node associated with a record from the group of records, an edge connecting two nodes associated with two related records, wherein a node is associated with a weight corresponding to a number of edges connected to the node, wherein a record is added to the dense subset based on its associated node having a highest weight and a density that satisfies a density threshold, the density being based on the content of the dense subset, and wherein the content of the dense subset is to be processed as including duplicate records.

While one or more implementations and techniques are described with reference to an embodiment in which identifying duplicate records using dense subsets is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to determine dense subsets, identify and remove duplicate records associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
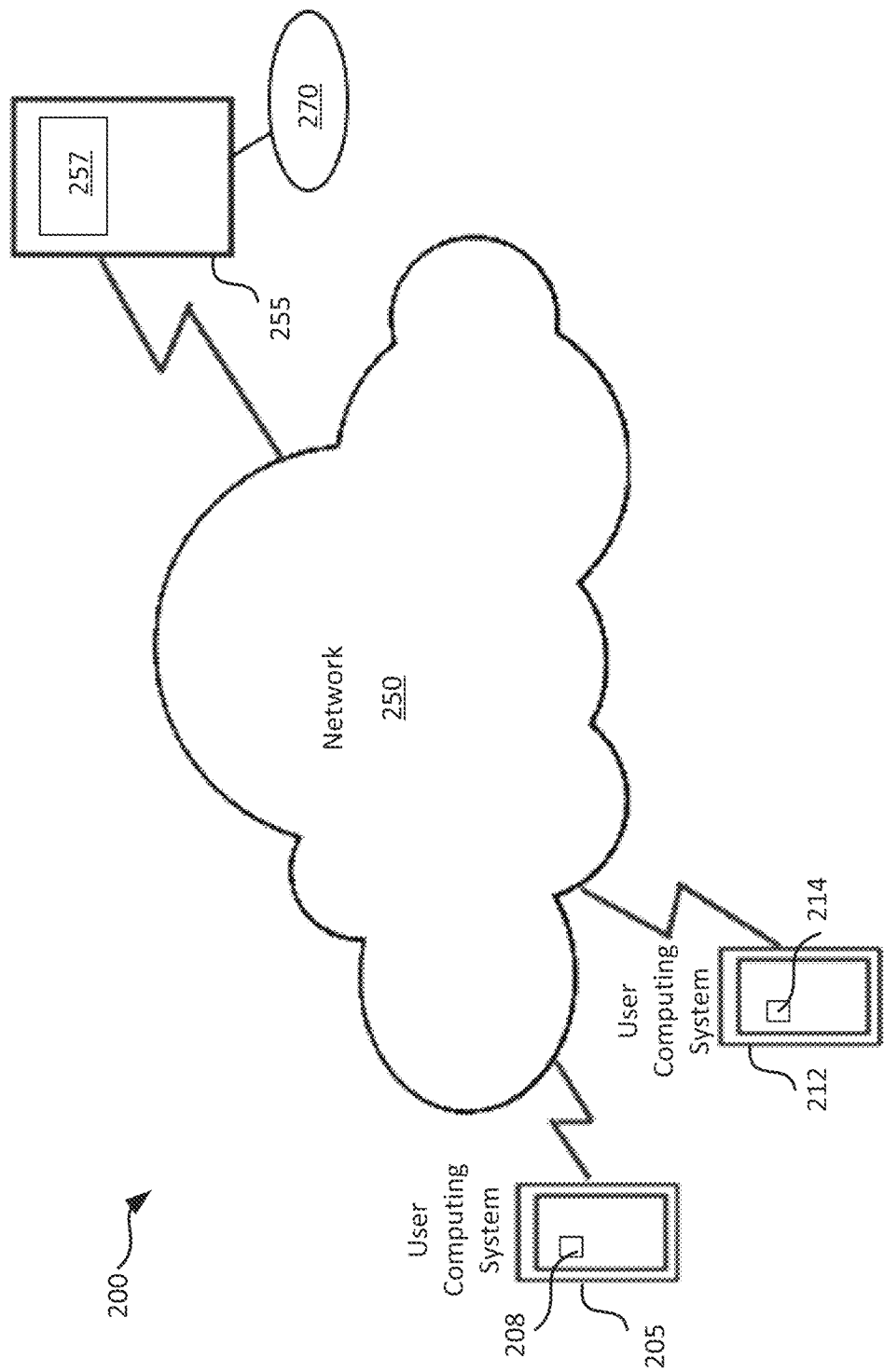
FIG. 2 shows a diagram of an example network environment that may be used with some embodiments.

FIG. 2 shows a diagram of an example network environment that may be used with some embodiments of the present invention. Network environment 400 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). For example, the user may log into the application 257 to initiate the process of determining dense subsets, identifying and removing duplicate records in a group of records in a CRM system. The server computing system 255 may be coupled with database 270. The server computing system 255 may be associated with an entity (e.g., Salesforce.com®).

Figure 3:
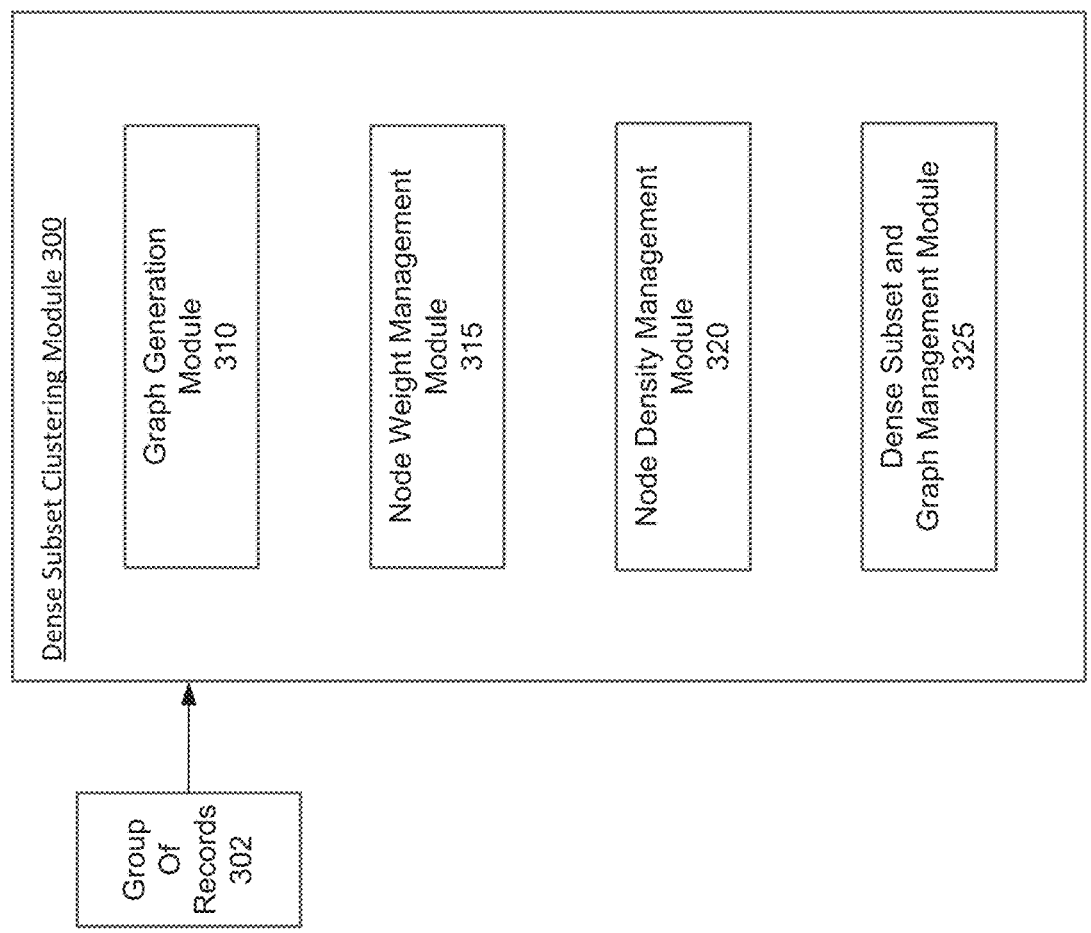
FIG. 3 shows an example of a dense subset clustering module that may be used to identify and remove duplicate records, in accordance with some embodiments.

FIG. 3 shows an example of a dense subset clustering module that may be used to identify and remove duplicate records, in accordance with some embodiments. Dense subset clustering module 300 may be associated with a computing system that is used by an administrator or a user who is responsible for removing duplicate records in a group of records 302.

For some embodiments, the group of records 302 may include related records associated with a customer or an organization, and the dense subset clustering module 300 is configured to identify all of the duplicate records in the group and remove them. The group of records 302 may be stored in a database such as database 270 shown in FIG. 2.

Figure 9:
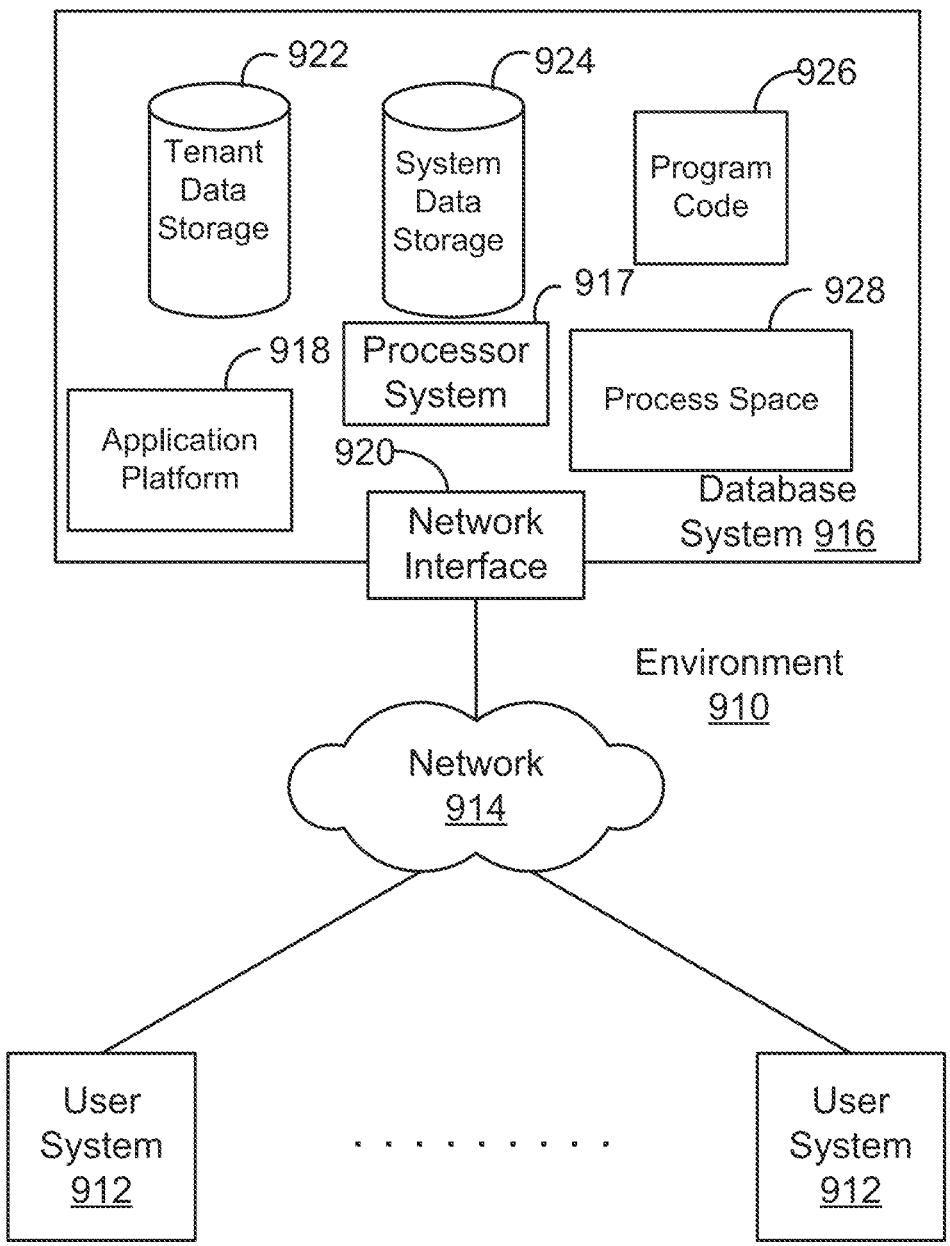
FIG. 9 shows a system diagram illustrating the architecture of a multitenant database environment, in accordance with some embodiments.

The group of records 302 may be associated with a web-based customer relationship management (CRM) database system 916 shown in FIG. 9.

The dense subset clustering module 300 may include graph generation module 302 configured to generate a graph having nodes and edges representing the group of records 302. For some embodiments, the records in the group of records 302 may be keyed into multiple keys. For example, when the records are employee records, the multiple keys may be associated with a last name, first name, account name, etc.

The graph generation module 310 may associate a node to each record and may associate an edge to each pair of related records, with the edge connecting the two nodes associated with the two related records. A record that is not related to another record may be associated with a node that has no connecting edge. For some embodiments, the graph representation of the group of records may have already been established and the subset clustering module 300 may receive the graph representation (referred to herein as a graph) instead of the group of records. In that situation, there may not be a need for the graph generation module 310 in the dense subset clustering module 300.

The dense subset clustering module 300 may include a node weight management module 315 configured to evaluate the graph and determine the number of edges that each node is connected with. A weight is assigned to each node based on the number of connecting edges. When the graph is updated, the node weight management module may re-evaluate the graph to determine if the weights of the nodes need to be updated. For example, when nodes are removed from the graph, the node weights of the remaining nodes may change.

The dense subset clustering module 300 may include a node density management module 320 configured to determine and manage the density of the nodes in the graph. The density of a node may be determined based on the content of the dense subset at a particular time. For example, the density of a node at time t1 may increase at time t2 after the content of the dense subset is updated. The density of a node may determine whether a record associated with the node can be added to the dense subset.

The dense subset clustering module 300 may include a dense subset and graph management module 325 configured to keep track of the content of the dense subsets and the state of the graph. The graph may be associated with one or more dense subsets. The dense subset and graph management module 325 may need to keep track of the records included in each of the dense subsets. The dense subset and graph management module 325 may be configured to remove nodes associated with a completed dense subset from the graph to create an updated graph. The dense subset and graph management module 325 may need to keep track of the nodes and edges included in the graph whenever the graph is updated and to cause the updated graph to be evaluated for any additional dense subsets.

Figure 4:
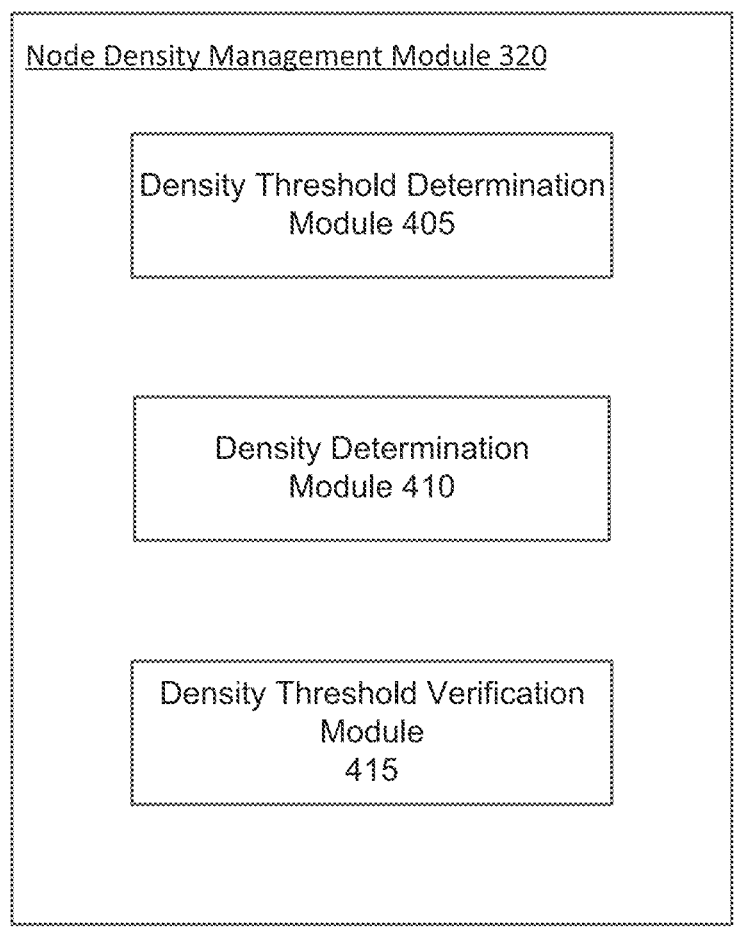
FIG. 4 shows an example of the node density management module, in accordance with some embodiments.

FIG. 4 shows an example of the node density management module, in accordance with some embodiments. The node density management module 320 may be configured to determine the density of the nodes in the graph whether or not the nodes are associated with the content of a dense subset. The density of a node may be based on a number of nodes that the node is connected with and based on a total number of nodes, with respect to the content of the dense subset. For example, if the dense subset includes four records corresponding to four nodes, and the node being evaluated is connected to three (3) of the four (4) nodes, then the density of the node being evaluated is 75%. The density of the nodes in the graph may change after each update to the content of the dense subset. For example, the density of a node at time t1 may be lower or higher at time t2 after the content of the dense subset is updated. The update to the content of the dense subset may include adding a record into the dense subset or removing a record from the dense subset.

The node density management module 320 may include a density threshold determination module 405 configured to set a value for a density threshold. The value of the density threshold may be received from an administrator via a user interface. If the density threshold is not received, the density threshold determination module 405 may set the density threshold to a default value. For example, the default value for the density threshold may be set to 100%.

The node density management module 320 may include a density determination module 410 configured to determine a density for each of the nodes in the graph whether or not the node is associated with a record in the dense subset. The density determination module 410 may be configured to compare a density of a node with the density threshold to determine if the node satisfies or fails the density threshold. As will be described, a node may need to satisfy the density threshold in order for its associated record to be considered for the dense subset. The density determination module 410 may need to determine the density of each node in the graphs each time a dense subset is updated.

The node density management module 320 may include a density threshold verification module 415 configured to verify if a density of a node satisfies the density threshold. The verification may be applied to nodes associated with the records that are included in the dense subset. For some embodiments, a record that is included in a dense subset may remain in the dense subset as long as its density satisfies the density threshold. The verification may also apply to nodes that are not associated with any records in the dense subset. For example, verification may be applied to a node to determine if its associated record can be added to the dense subset.

Figure 5:
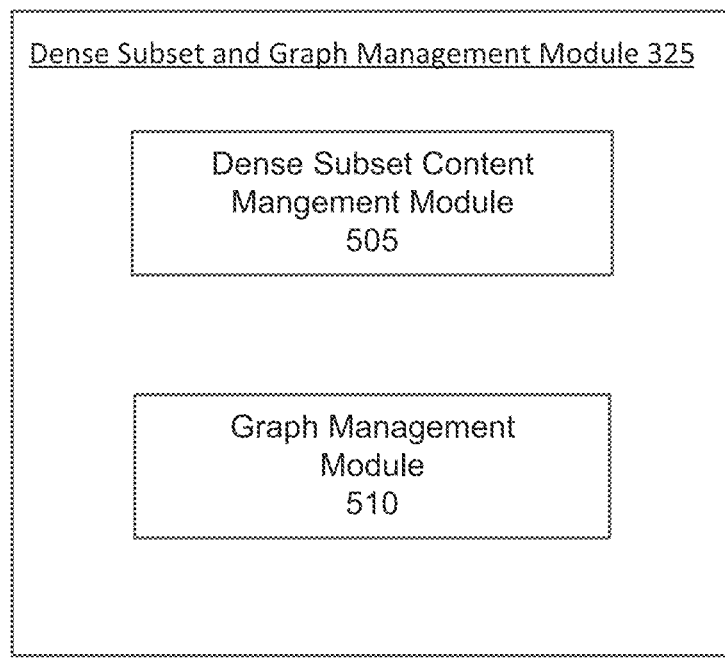
FIG. 5 shows an example of the density subset and graph management module, in accordance with some embodiments.

FIG. 5 shows an example of the density subset and graph management module, in accordance with some embodiments. The density subset and graph management module 325 may include a dense subset content management module 505 configured to keep track of the content of the dense subset as the dense subset is being generated. For example, when a dense subset is updated, a record may be added to or removed from the dense subset. The dense subset content management module 505 may need to keep track of the records in the dense subset and their associated densities. When the generation of a dense subset is completed, the dense subset content management module 505 may need to update a dense set to include the completed dense subset.

The density subset and graph management module 325 may include a graph management module 510 configured to keep track of the state of the graph each time the graph is updated. The state of the graph may include the nodes and the edges in the graph. For example, when a dense subset is completed, the nodes associated with the records in the completed dense subset may be removed from the graph to create an updated graph. The updated graph may have fewer nodes and their updated edges. The graph management module 510 may need to keep track of the updated weights and updated densities of the nodes.

Figure 6A:
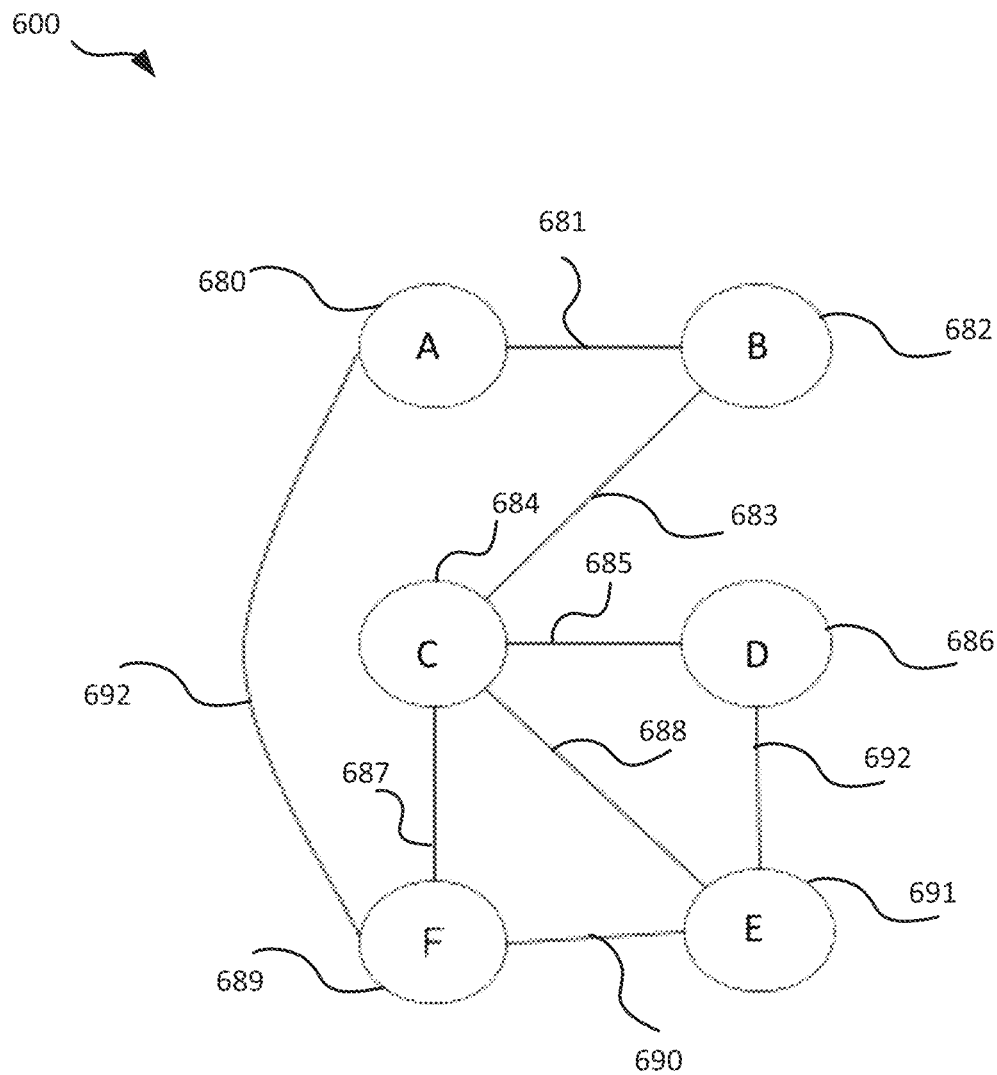
FIG. 6A shows an example graph representing a group of records using nodes and edges, in accordance with some embodiments.

FIG. 6A shows an example graph representing a group of records using nodes and edges, in accordance with some embodiments. For some embodiments, a computerized representation of a graph (referred to herein as a graph) may be used to illustrate the relationship of the records in a group of records. The graph 600 includes nodes and edges with a node representing a record and an edge connecting two nodes representing a relationship between two records. The group of records in this example includes records A, B, C, D, E and F. A relationship between the record A and the record B is represented by edge 681 directly connecting the node 680 to the node 682. A record may be associated with multiple relationships. For example, the node 684 (record C) is shown to be connected to four (4) edges 683, 685, 687 and 688. Similarly, the node 691 (record E) is shown to be connected to three (3) edges 688, 690 and 692.

FIG. 6B shows an example weight table that includes information about the nodes and their corresponding weights, in accordance with some embodiments. For some embodiments, a weight may be assigned to each node based on a number of edges that the node is connected to. FIG. 6B shows the weight of all of the nodes in the graph shown in FIG. 6A. For example, the node 684 (record C) has a weight of four (4) and the node 691 (record E) has a weight of three (3).

For some embodiments, the density of a node to a dense subset may be determined based on whether that node is connected to all of the nodes associated with the records that are in the dense subset. For example, if there are three (3) records in a dense subset, and the node being evaluated is connected to all three (3) nodes associated with the three (3) records, then the density of the node being evaluated is 100% (or 3/3). If the node being evaluated is only connected to two (2) of those three (3) nodes, then the density of that node is 66.6% (or 2/3). If the node being evaluated is not connected any of the three (3) nodes, then the density of that node is 0% (or 0/3). The density of a node may then be compared to a density threshold. For example, the density threshold may be set at 100%. In order for a record to be added to a dense subset, the density of its associated node has to satisfy the density threshold. For some embodiments, the density threshold may be determined by a system administrator responsible for de-duplication.

For some embodiments, a record associated with a node having a highest weight may be selected as a first record in a dense subset. In the example of FIGS. 6A-6B, the record C may be selected as the first record in a dense subset because the record C is associated with the node 684 which has a highest weight of four (4). The dense subset may then be updated to include the record C as {C}.

For some embodiments, the weight of each of the remaining nodes in the graph and its density may be used to determine whether a record associated with that node may be added to a dense subset.

Referring to FIGS. 6A and 6B and using the density threshold of 100%, the nodes that are connected to the node 684 (record C) include the node 682 (record B), node 686 (record D), node 691 (record E), and node 689 (record F). For some embodiments, when two or more nodes have the same weight, any one of them may be selected. In the current example, since the node 691 (record E) and the node 689 (record F) have the highest weight of three (3), either one of these two nodes may be selected. Assuming that the node 691 (record E) is selected, the content of the dense subset may then be updated to include the record E as {C, E}.

The process of determining whether a record is to be added to a dense subset may be repeated with the remaining nodes based on their weights and densities. For example, after the record E is added to the dense subset, the other nodes that satisfy the density threshold include node 686 (record D) and node 689 (record F) because each node is connected to both node 684 (record C) and node 691 (record E). The node 682 (record B) is not considered because the node 682 is connected only to the node 684 and not connected to the node 691. Between the two nodes 686 (record D, weight=2) and the node 689 (record F, weight=3), the node 689 (record F) is selected because it has a highest weight. The content of the dense subset may then be updated to include the record F as {C, E, F}.

Since none of the remaining nodes is connected to all of the nodes associated with the records in the dense subset {C, E, F}, their densities fail the density threshold of 100%, and their associated records may not be added to the dense subset. The process of identifying records for addition to the dense subset {C, E, F} may be considered completed. For some embodiments, the nodes associated with the records in a dense subset may be removed from the graph, and the remaining nodes may then be evaluated to determine another dense subset, starting with a node having a highest weight.

Figures 6C, 6D:
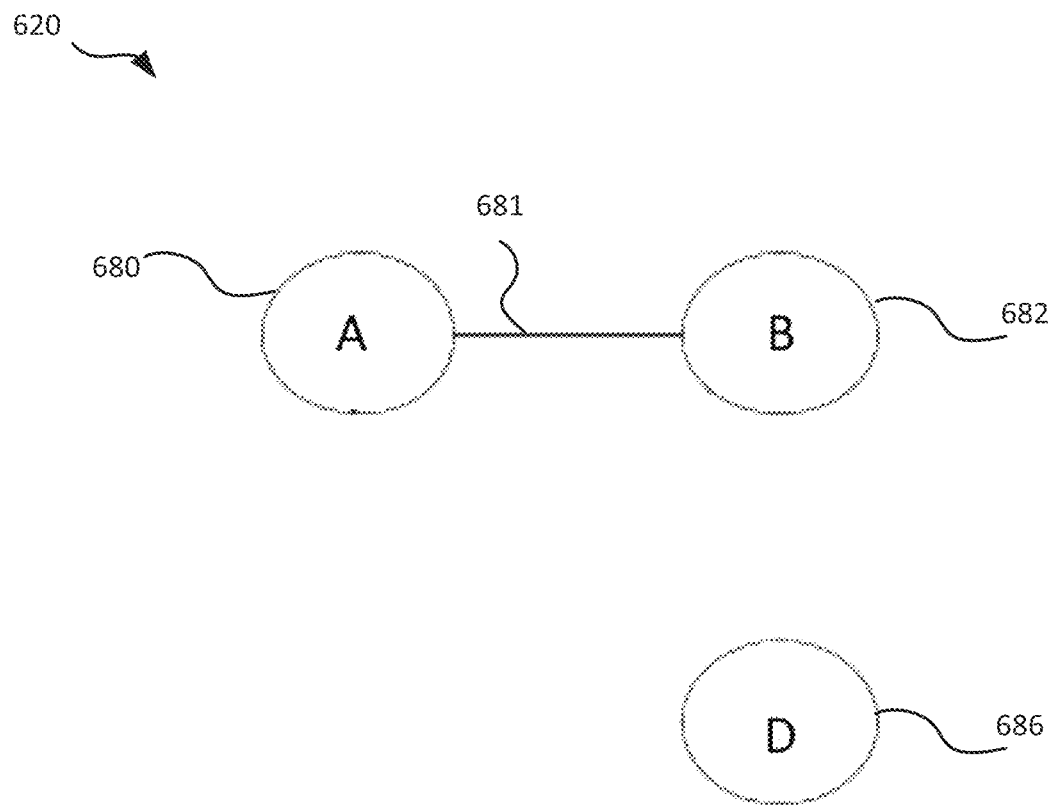
FIG. 6C shows an example updated graph after the nodes associated with the records in a dense subset have been removed, in accordance with some embodiments.
FIG. 6D shows an example updated weight table that includes information about the nodes and their corresponding weights from the updated graph, in accordance with some embodiments.

FIG. 6C shows an example updated graph after the nodes associated with the records C, E and F in the dense subset have been removed. In the graph 620, there are three nodes remaining from the graph 600 of FIG. 6A. This includes the node 680 (record A), the node 682 (record B), and the node 686 (record D). Of these three remaining nodes, only the node 680 and the node 682 are connected via the edge 681.

FIG. 6D shows an example updated weight table that includes information about the nodes and their corresponding weights from the updated graph, in accordance with some embodiments. Based on FIGS. 6C and 6D, and by repeating the same process that generates the dense subset {C, E, F}, two additional dense subsets {A, B} and {D} are generated. The record D is in a dense subset by itself because its associated node 686 is not connected to any other nodes. After all of the nodes of the graph of FIG. 6A have been evaluated, the resulting dense set DS includes three dense subsets and can be represented as DS={{C, E, F}, {A, B}, D}.

The generation of the dense subsets described with the examples in FIGS. 6A-6C may be described with a pseudo code. For example, let G=(V, E) where G is a graph such as shown in FIG. 6A, V is a set of nodes in the graph, and E is a set of edges connecting the nodes V in the graph G. Let S be one or more dense subsets, and let DS be a dense set containing the dense subsets S. The dense set DS is initially empty, or DS={ }. Let d be a density threshold. A pseudo code DenseSubset and Find_Large_DenseSubset may be as follows:

It may be noted that the determination whether "G[S+{v}] has density >=d" in the pseudo code Find_Large_Dense-Subset(G,d) involves determining whether v is directly connected to every node associated with the records in the dense subset S when the density threshold d is 100%.

FIG. 6E shows an example density table that includes information about the nodes in the graph of FIG. 6A and their corresponding densities and weights, in accordance with some embodiments. Using the graph 600 shown in FIG. 6A, the node 684 has the highest weight, so its associated record C is the first record added to the dense subset represented as {C}. It may be noted that the densities of the nodes in a graph may only be determined with respect to a dense subset that is not empty.

Using the density threshold d=65%, FIG. 6E shows the densities of the remaining nodes with respect to the node 684. As shown, the density of the node 691 (record E) is 100%, the density of the node 689 (record F) is 100%, the density of the node 686 (record D) is 100%, the density of the node 682 (record B) is 100%, and the density of the node 680 (record A) is 0%. It may be noted that the density of a node may change when the dense subset is updated. From the remaining nodes, since the node 691 has a highest weight and also satisfies the dense threshold, the record E is added to the dense subset. The dense subset is updated to include two records as {C, E}.

FIG. 6F shows an updated density table after the record E is added to the dense subset, in accordance with some embodiments. The density of the node 682 (record B) is shown in FIG. 6E as 100%; however, it is shown in FIG. 6F as only 50%. The change in the density of the node 682 (record B) to 50% is caused by the node 682 being connected to one of two nodes in the dense subset of {C, E}. From the remaining nodes, since the node 689 has a highest weight and also satisfies the dense threshold, the record F is added to the dense subset. The dense subset is updated to include three records as {C, E, F}.

FIG. 6G shows another updated density table after the record F is added to the dense subset, in accordance with some embodiments. The density of the node 686 (record D) is shown in FIG. 6F as 100%; however, it is shown in FIG. 6G as only 66.7%. The change in the density of the node 686 (record D) to 66.7% is caused by the node 686 being connected only two of three nodes associated with the content of the updated dense subset {C, E, F}. Similarly, the density of the node 682 (record B) is shown in FIG. 6F as 50%; however, it is shown in FIG. 6G as only 33%. The

```
DenseSubset(G)                          // Find dense subsets in graph G
BEGIN:
While G is not empty
{ S←Find_Large_DenseSubset (G, d)       // Find dense subset S in G using density threshold d
    G = G - S                           // Remove dense subset S from graph G
    DS = DS ∪ {S}                       // Add dense subset S to dense set DS
}
return DS                               // Result is a dense set DS
END
Find_Large_DenseSubset(G,d)
Initialization: S ← {v}, where v is a node in graph G with a highest weight
Repeat:
    1. Find a node v in V-S such that G[S+{v}] has density >= d.
       If more than one v satisfies the density threshold condition, select the v having the
       highest weight in G.
    2. S ← S + {v}
Terminate: Return S when repeat fails.
``` change in the density of the node 682 (record B) to 33% is caused by the node 682 being connected only one of three nodes associated with the content of the updated dense subset {C, E, F}. From the remaining nodes, since the node 686 has a highest weight and also satisfies the dense threshold, the record D is added to the dense subset. The dense subset is updated to include four records as {C, E, F, D}.

FIG. 6H shows another updated density table after the record D is added to the dense subset, in accordance with some embodiments. The density of the node 682 (record B) is shown in FIG. 6G as 33%; however, it is shown in FIG. 6H as only 25%. The change in the density of the node 682 (record B) to 25% is caused by the node 682 being connected to only one of four nodes associated with the content of the updated dense subset of {C, E, F, D}. Similarly, the density of the node 680 (record A) is shown in FIG. 6G as 33%; however, it is shown in FIG. 6H as only 25%. The change in the density of the node 680 (record A) to 25% is caused by the node 680 being connected to only one of four nodes associated with the content of the updated dense subset of {C, E, F, D}. Since both the node 680 (record A) and the node 682 (record B) have densities less than the density threshold of 65%, the process of generating the dense subset {C, E, F, D} is completed. The nodes corresponding to the records C, E, F and D and their associated edges may then be removed from the graph 600 of FIG. 6A. The remaining nodes on the graph include the node 680 (record A) and the node 682 (record B). By repeating the same process described above, a second dense subset {A, B} is generated resulting in two dense subsets {C, E, F, D) and {A, B} from the graph 600 of FIG. 6A based on the 65% density threshold. Using the process described above to identify the dense subsets may help identifying records that are considered to be tightly related.

The density of a node may increase or decrease, whether the node is associated with a record in a dense subset or not. Thus, it may be possible to have a node with a density that fails the density threshold at time t1 but satisfies the density threshold at time t2 or vice versa. For some embodiments, when a record is already in a dense subset, the density of its associated node may still need to satisfy the density threshold with regard to the dense subset in order for the record to remain in the dense subset. For some embodiments, if the addition of a new record into a dense subset causes an existing record in the dense subset to be removed due to its associated node failing the density threshold, the new record may not be added to the dense subset allowing the existing record to remain in the dense subset.

Figure 6I:
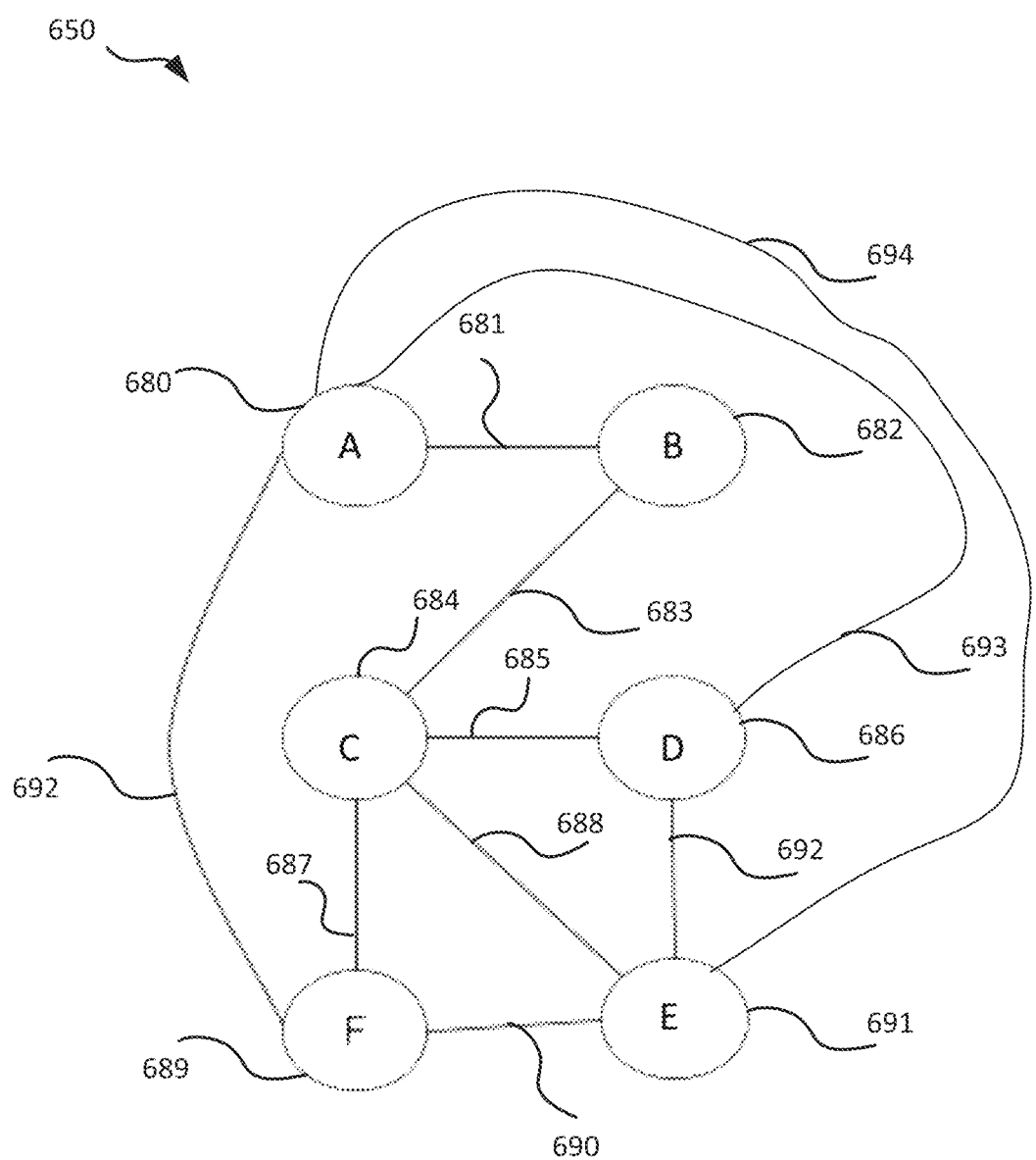
FIG. 6I shows another example graph representing a group of records using nodes and edges, in accordance with some embodiments.

FIG. 6I shows another example graph representing a group of records using nodes and edges, in accordance with some embodiments. The graph 650 shown in FIG. 6I is almost similar to the graph 600 shown in FIG. 6A, except for the addition of the edge 693 connecting the node 680 (record A) to the node 686 (record D) and the addition of the edge 694 connecting the node 680 (record A) to the node 691 (record E). The dense subsets from the graph of FIG. 6I may then be generated by using the process described above with the graph of FIG. 6A. Using the graph shown in FIG. 6I, the record C is the first record added to the dense subset because the node 684 has the highest weight. The dense subset may then be updated to include the record C as {C}.

FIG. 6J shows an example density table that includes information about the nodes in the graph of FIG. 6I together with their corresponding densities and weights, in accordance with some embodiments. Using the density threshold d=65%, FIG. 6J shows the densities of the remaining nodes with respect to the node 684 (record C). As shown, the density of the node 691 (record E) is 100%, the density of the node 689 (record F) is 100%, the density of the node 686 (record D) is 100%, the density of the node 682 (record B) is 100%, and the density of the node 680 (record A) is 0%. Since the node 681 (record E) has the density of 100%, and since it has the highest weight (4), the record E is selected to be added to the dense subset. The content of the dense subset may then be updated to include the record E as {C, E}.

FIG. 6K shows an updated density table after the record E is added to the dense subset, in accordance with some embodiments. The density of the node 682 (record B) is shown in FIG. 6J as 100%; however, it is shown in FIG. 6K as having decreased to 50%. The decrease in the density of the node 682 (record B) to 50% is caused by the node 682 being connected to one of two nodes associated with the content of the updated dense subset of {C, E}. It may be noted that the density of the node 680 (record A) is shown in FIG. 6J as 0% because the node 680 is not connected to the node 684 (record C) in the dense subset {C}; however, the density of the node 680 (record A) is shown in FIG. 6K as having increased to 50%. The increase in the density of the node 680 (record A) to 50% is caused by the node 680 being connected to the node 691 (record E) of the updated dense subset of {C, E}. Since the node 689 (record F) has the density (100%) that satisfies the density threshold and it has a highest weight (3), the record F is selected to be added to the dense subset. The content of the dense subset may then be updated to include the record F as {C, E, F}.

FIG. 6L shows another updated density table after the record F is added to the dense subset, in accordance with some embodiments. The density of the node 686 (record D) is shown in FIG. 6K as 100%; however, it is shown in FIG. 6L as having decreased to 66.7%. The decrease in the density of the node 686 (record D) to 66.7% is caused by the node 686 being connected only two of three nodes associated with the content of the updated dense subset of {C, E, F}. The density of the node 682 (record B) is shown in FIG. 6K as 50%; however, it is shown in FIG. 6L as having decreased to 33%. The decrease in the density of the node 682 (record B) to 33% is caused by the node 682 being connected only one of three nodes associated with the content of the updated dense subset {C, E, F}. The density of the node 680 (record A) is shown in FIG. 6K as 50%; however, it is shown in FIG. 6L as having increased to 66.7%. The increase in the density of the node 680 (record A) to 66.7% is caused by the node 680 being connected to two of three nodes associated with the content of the updated dense subset of {C, E, F}. Since the node 680 (record A) has the density (66.7%) that satisfies the density threshold, and since it has a highest weight (4), the record A is selected to be added to the dense subset. The content of the dense subset may then be updated to include the record A as {C, E, F, A}.

FIG. 6M shows another updated density table after the record A is added to the dense subset, in accordance with some embodiments. The density of the node 682 (record B) is shown in FIG. 6L as 33%; however, it is shown in FIG. 6M as having increased to 50%. The increase in the density of the node 682 (record B) to 50% is caused by the node 682 being connected to two of four nodes associated with the content of the updated dense subset of {C, E, F, A}. Similarly, the density of the node 686 (record D) is shown in FIG. 6L as 66.7%; however, it is shown in FIG. 6M as having increased to 75%. The increase in the density of the node 686 (record D) to 75% is caused by the node 686 being connected to three of four nodes associated with the content of the updated dense subset of {C, E, F, A}. Since the node 686 (record D) has the density (75%) that satisfies the density threshold, the record D is selected to be added to the dense subset. The dense subset may then be updated to include the record D as {C, E, F, A, D}. The record B is not added to the dense subset because its associated node 682 has a density of 50%, failing the density threshold. The record B is therefore added to a dense subset by itself. Thus, the process described with FIGS. 6I-6M yields two dense subsets {C, E, F, A, D} and {B}.

Figure 6N:
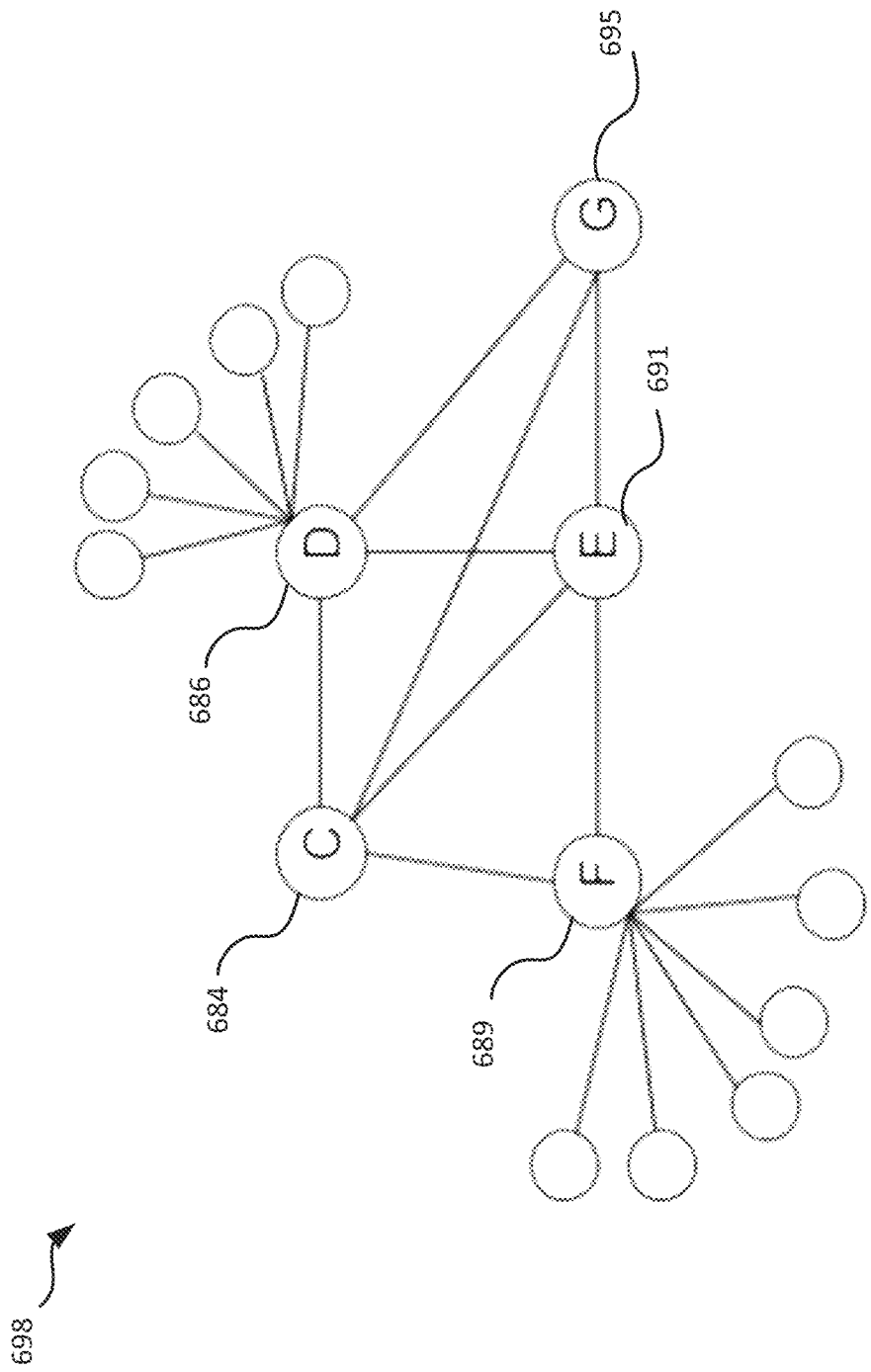
FIG. 6N shows another example graph representing a group of records using nodes and edges to demonstrate density reduction of a node associated with a record in a dense subset, in accordance with some embodiments.

FIG. 6N shows another example graph representing a group of records using nodes and edges to demonstrate density reduction of a node associated with a record in a dense subset, in accordance with some embodiments. Using the same process of determining weights and densities described above, the weights and densities of the nodes of the graph 698 can be determined such as node 684 (record C, weight=4), node 686 (record D, weight=8), node 691 (record E, weight=4), node 689 (record F, weight=8), and node 695 (record G, weight=3). Other nodes are also shown in the graph 698 as being connected to the nodes associated with the records C, D, E, F and G. Since both the node 689 (record F) and the node 686 (record D) have the highest weight of 8, either node can be selected as the first node whose record will be added to the dense subset. If the node 689 is selected, the record F is the first record added to the dense subset, and the content of the dense subset is represented as {F}.

If the density threshold is set at 66%, then the density of all the other nodes are determined based on their connection with the node F. In this example, the densities of the nodes may be as follows: node 684 (record C)=100%, node 691 (record E)=100%, node 686 (record D)=0%, and node 695 (record G)=0%. Both of the nodes 684 (record C) and 691 (record E) have densities that satisfy the density threshold of 66% and both have the same weight of four (4), there are two possible paths. In the first path, the node 684 (record C) is selected. In the second path, the node 691 (record E) is selected. If the first path is selected, the content of the dense subset can be updated to be as {F, C}.

After the record C is added to the dense subset, the densities of the remaining nodes may be updated. In this example, the densities of the nodes may be as follows: node 691 (record E)=100%, node 686 (record D)=50%, and node 695 (record G)=0%. Because only the node 691 (record E) has a density that satisfies the density threshold of 66%, the record E is added to dense subset, and the content of the dense subset can be updated to be as {F, C, E}.

After the record E is added to the dense subset, the densities of the remaining nodes may be updated. In this example, the densities of the nodes may be as follows: node 686 (record D)=66.7%, and node 695 (record G)=66.7%. Although both the nodes 686 and 695 have densities that satisfy the density threshold, because the node 686 (record D) has a higher weight of eight (8) as compared to the weight of the node 695 (record G) at three (3), the node 686 is selected, and the record D is added to the dense subset. The content of the dense subset can be updated to be as {F, C, E, D}.

After the record D is added to the dense subset, the density of the remaining node 695 (record G) may be updated to be 75% because G is connected to three of the four nodes associated with the four records F, C, E, D in the dense subset. Because the node 695 satisfies the density threshold, the record G may be added to the dense subset.

Returning to an earlier step with the same graph 698 of Figure N, when there are two paths to select because both of the nodes 684 (record C) and 691 (record E) have densities that satisfy the density threshold of 66% and both have the same weight of four (4). If, instead of using the first path, the second path is selected and the record E is added to the dense subset. The content of the dense subset can be updated to be as {F, E}. Selecting the second path will eventually yield the dense subset {F, E, C, D} which has the same records as the dense subset {F, E, C, D} resulting from selecting the first path.

After the record D is added to the dense subset using either the first path or the second path, the density of the remaining node 695 (record G) may be updated to be 75% because G is connected to three of the four nodes associated with the four records F, C, E, D in the dense subset. Because the node 695 satisfies the density threshold, the record G may be added to the dense subset. The content of the dense subset can be updated to be as {F, C, E, D, G}.

It may be noted that, prior to the addition of the record G into the dense subset, the density of the node 689 (record F) may be 66.7% relative to the node 684 (record C), node 691 (record E) and node 686 (record D) in the dense subset because the node 689 (record F) is connected to two (nodes 684 and 691) out of the three nodes. At the density of 66.7%, the node 689 (record F) satisfies the density threshold of 66%. However, with the addition of the record G into the subset, the node 689 (record F) is connected to only two of the four nodes associated with the records in the dense subset, decreasing its density from 66.7% to 50%. This causes the node 696 (record F) to fail the density threshold of 66%. For some embodiments, if the addition of a record into a subset causes a density of a node associated with the content of the dense subset to fail the density threshold, the addition of the record may not be performed. For some other embodiments, if the addition of a record into a subset causes a density of a node associated with the content of the dense subset to fail the density threshold, the addition of the record may continue, and the record associated with the node that fails the density threshold may be removed from the dense subset.

As described above, when the content of a dense subset is updated, the densities of all the nodes may need to be re-determined. This may require traversing the entire graph. The process can be time and resource consuming, especially when the graph represents a large group of records. For some embodiment, the density of a node with respect to a dense subset may be determine using the following alternative approach. Let S be the dense subset, X be a node in the graph, and T be a number of nodes associated with the records in S that the node X is connected to. Let Y be a node whose associated record is being added to the dense subset S. If the node X is connected to the node Y in the graph, let T=T+1. If the node X is not connected to the node Y, the value of T remains the same. The density of the node X may be determined using the formula: density (X)=T/|S|, where |S| is the total number of nodes associated with the content of S. By using this approach, the densities of the nodes can be updated in a linear time.

Figure 7:
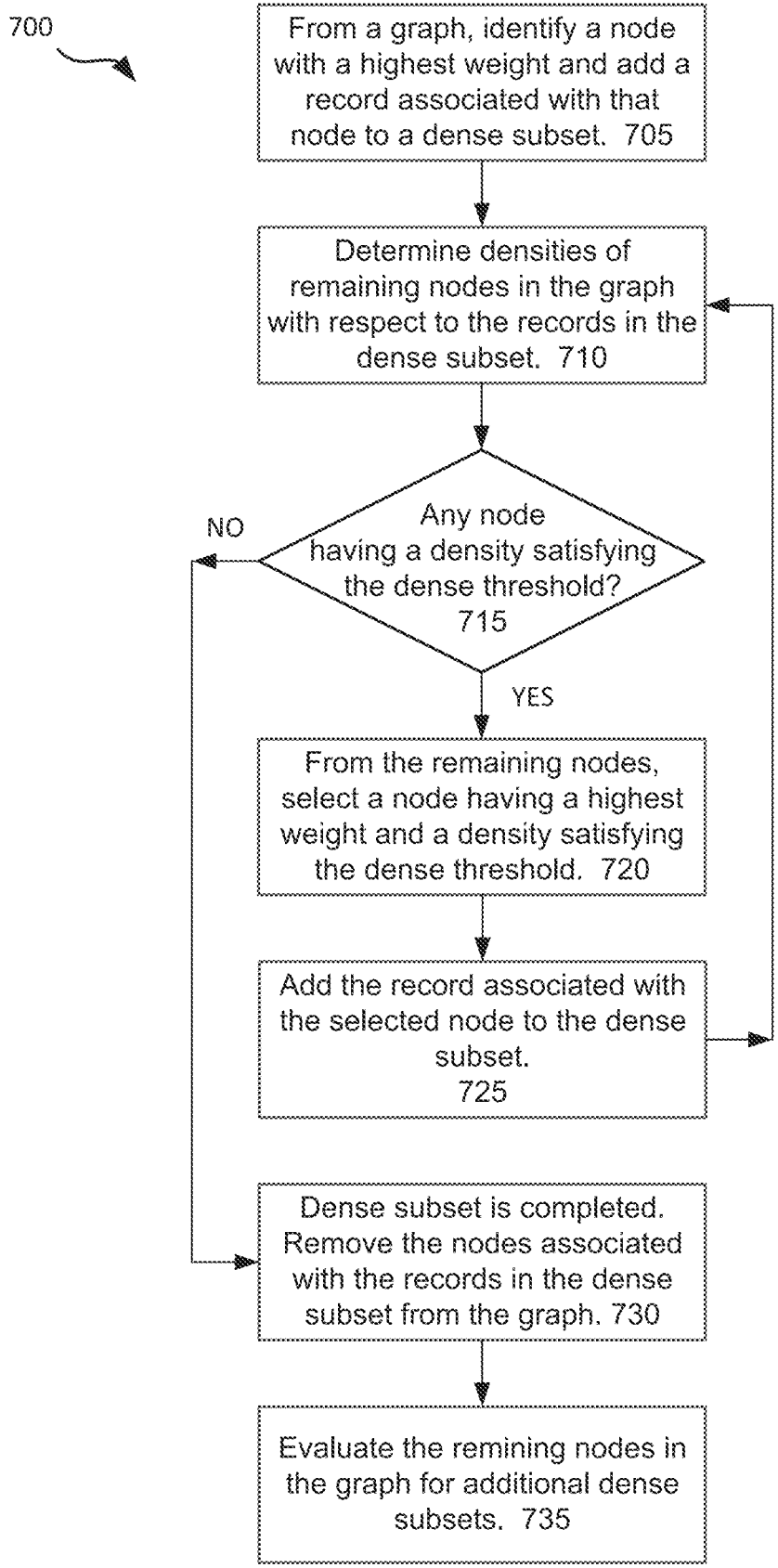
FIG. 7 shows a flowchart of an example process for generating dense subsets from a graph of nodes and edges, in accordance with some embodiments.

FIG. 7 shows a flowchart of an example process for generating dense subsets from a graph of nodes and edges, in accordance with some embodiments. The example process 700 may be used to evaluate a group of records to determine dense subsets. The group of records may be associated with an organization and may need to be incorporated into a CRM database system. The group of records may be represented as a graph with nodes and edges where a node represents a record and an edge represents a connection between two records. An example is shown in graph 600 of FIG. 6A. Each node is assigned a weight representing a number of connections that the node is associated with. An example of the weights is shown in FIG. 6B. A density threshold is selected.

The process may start at block 705 where a node with a highest weight is selected and its associated record is added to the dense subset. At block 710, the density of each of the remaining nodes in the graph is determined with respect to the current content of the dense subset.

At block 715, a test is performed to determine if any of the remaining nodes satisfy the density threshold. If there are nodes satisfying the density threshold, the process flows from block 715 to block 720 where a node with a highest weight and also satisfies the density threshold is selected.

At block 725, a record associated with the selected node is added to the dense subset. From block 725, the process continues at block 710 where the densities of the remaining nodes are determined with respect to the updated content of the dense subset.

From block 715, if none of the remaining nodes satisfy the density threshold, the process flows to block 730 where the addition of records into the dense subset is considered completed. The nodes associated with the records in the dense subset may then be removed from the graph.

At block 735, the remaining nodes in the graph may then be evaluated for additional dense subsets. Although not shown, the process may stop when all of the nodes in the graph are evaluated and removed from the graph. When completed, the process may yield a dense set with one or more dense subsets.

Figure 8A:
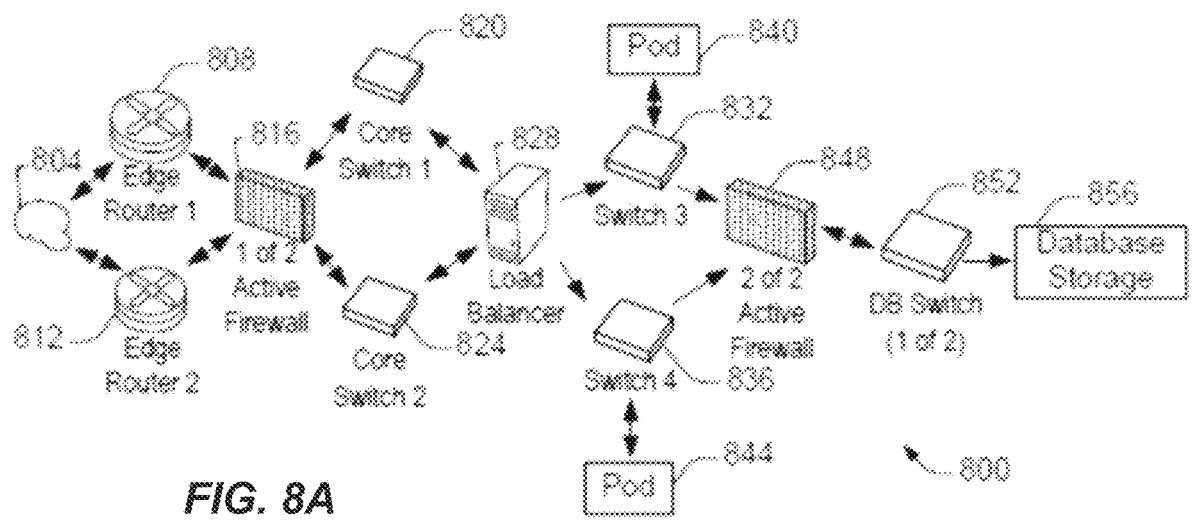
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
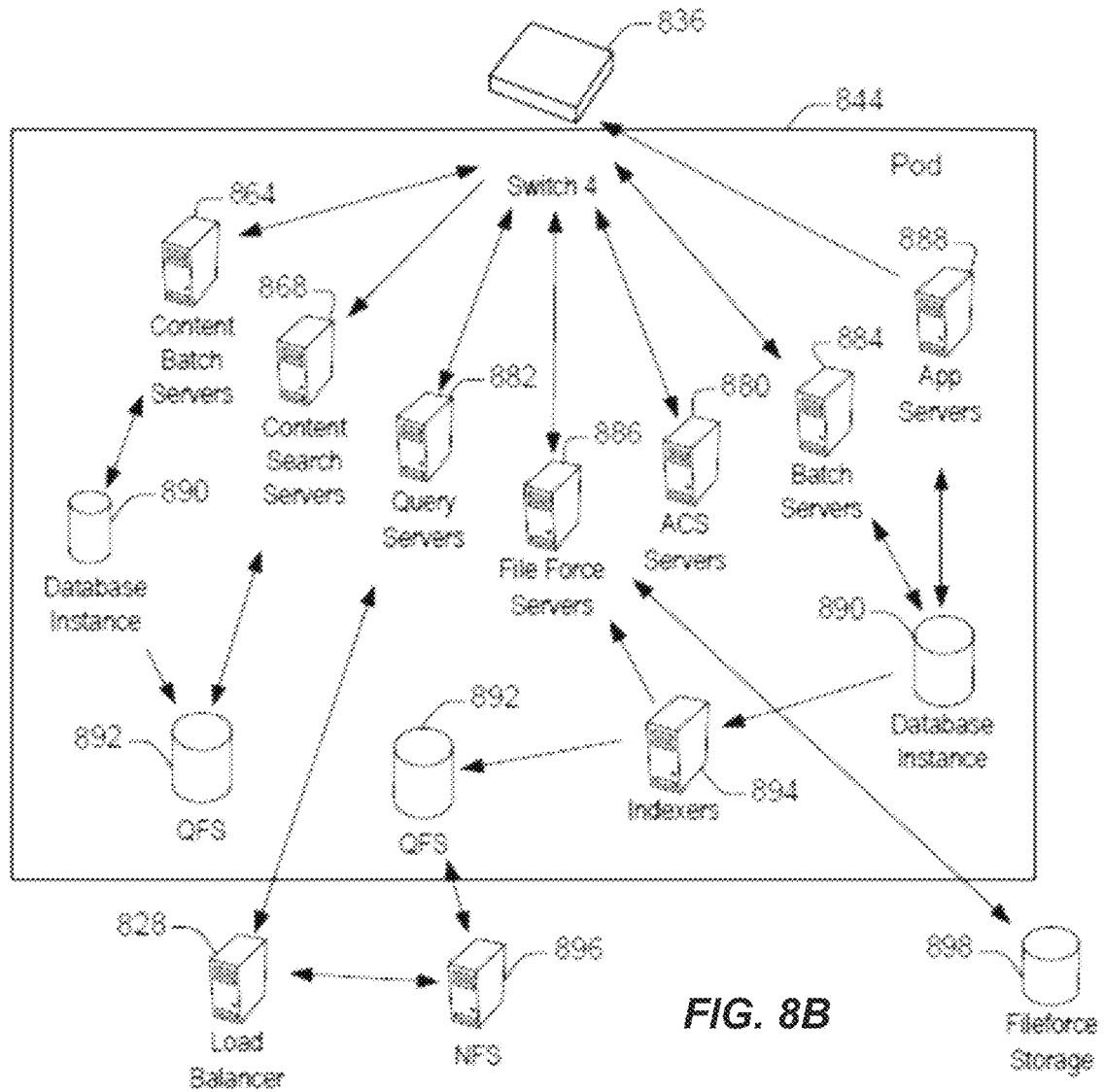
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for determining a dense subset from a group of records using a graphical representation, the method comprising:
    providing, by a database system, a graphical representation of the group of records, the graphical representation having a plurality of nodes and a plurality of edges, each node being associated with a record from the group of records and each edge being defined as a connection between two nodes, each edge symbolizing that the records associated with the two connected nodes are related;
    associating, by the database system, a weight to each of the plurality of nodes, the weight being defined as equal to a number of edges connected to each node;
    generating, by the database system, a first dense subset of records by:
        adding a first record associated with a first node based on the first node having a highest weight among the plurality of nodes; and
        adding a second record associated with a second node having a highest weight amongst nodes connected to the first node by an edge in the graphical representation;
    identifying, by the database system, a node from the graphical representation (1) that is associated with a record that is not part of the first dense subset and (2) has a highest associated weight among a group of nodes associated with records outside of the records within the first dense subset;
    determining, by the database system, a density of the identified node, the density being equal to a number of nodes associated with records in the first dense subset that are connected to the identified node divided by a total number of nodes associated with records within the first dense subset;
    adding, by the database system, the record associated with the identified node to the first dense subset of records when the density of the identified node satisfies a density threshold;
    identifying, by the database system, a duplicate record from the first dense subset of records using match rules to compare records within the first dense subset to each other; and
    removing, by the database system, the duplicate record from the first dense subset of records.

2. The method of claim 1, the generating the first dense subset of records further comprising adding a plurality of records to the first dense subset, wherein each of the added plurality of records are associated with nodes connected to the first node.

3. The method of claim 2, further comprising determining a density of a third node based on (a) a number of nodes that the third node is connected to in the first dense subset and (b) a total number of nodes in the first dense subset.

4. The method of claim 3, wherein the third record is added to the first dense subset based on the third node having a highest weight and based on the density of the third node satisfying the density threshold, wherein the highest weight of the third node is determined excluding weights of nodes associated with records already in the first density subset.

5. The method of claim 4, wherein the third record is not added to the first dense subset if addition of the third record causes a density of any node associated with the content of the first dense subset to decrease and fail the density threshold.

6. The method of claim 5, wherein the density of one or more of the first node, second node and the third node is changeable based on the content of the first dense subset being updated.

7. The method of claim 6, wherein addition of records into the first dense subset is completed based on finding no other node in the graphical representation having a density satisfying the density threshold.

8. The method of claim 7, further comprising:
    removing nodes associated with the content of the first dense subset from the graphical representation; and
    determining a second dense subset from the graphical representation after said removing of the nodes from the graphical representation.

9. An apparatus for identifying duplicate records in a database object, the apparatus comprising:
    one or more processors; and
    a non-transitory computer readable medium storing a plurality of instructions, which when executed, cause the one or more processors to:
        provide a graphical representation of the group of records, the graphical representation having a plurality of nodes and a plurality of edges, each node being associated with a record from the group of records and each edge being defined as a connection between two nodes, each edge symbolizing that the records associated with the two connected nodes are related;
        associate a weight to each of the plurality of nodes, the weight being defined as equal to a number of edges connected to each node;
        generate, by the database system, a first dense subset of records by:

adding a first record associated with a first node based on the first node having a highest weight among the plurality of nodes; and adding a second record associated with a second node having a highest weight amongst nodes connected to the first node by an edge in the graphical representation;

identify a node from the graphical representation (1) that is associated with a record that is not part of the first dense subset and (2) has a highest weight among a group of nodes that are associated with a group of records outside of the records within the first dense subset;

determine a density of the identified node, the density being equal to a number of nodes associated with records in the first dense subset that are connected to the identified node divided by a total number of nodes associated with records within the first dense subset;

add the record associated with the identified node to the first dense subset of records when the density of the identified node satisfies a density threshold;

identifying, by the database system, a duplicate record from the first dense subset of records using match rules to compare records within the first dense subset to each other; and removing, by the database system, the duplicate record from the first dense subset of records.

10. The apparatus of claim 9, the generating the first dense subset of records further comprising adding a plurality of records to the first dense subset, wherein each of the added plurality of records are associated with nodes connected to the first node.

11. The apparatus of claim 10, further comprising instructions to determine a density of a third node based on (a) a number of nodes that the third node is connected to in the first dense subset and (b) a total number of nodes in the first dense subset.

12. The apparatus of claim 11, wherein the third record is added to the first dense subset based on the third node having a highest weight and based on the density of the third node satisfying the density threshold, wherein the highest weight of the third node is determined excluding weights of nodes associated with records already in the first density subset.

13. The apparatus of claim 12, wherein the third record is not added to the first dense subset if addition of the third record causes a density of any node associated with the content of the first dense subset to decrease and fail the density threshold.

14. The apparatus of claim 13, wherein the density of one or more of the first node, second node and the third node is changeable based on the content of the first dense subset being updated.

15. The apparatus of claim 14, wherein addition of records into the first dense subset is completed based on finding no other node in the graphical representation having a density satisfying the density threshold.

16. The apparatus of claim 15, further comprising:
removing nodes associated with the content of the first dense subset from the graphical representation; and
determining a second dense subset from the graphical representation after said removing of the nodes from the graphical representation.

17. A computer program product comprising computer-readable program code to be executed by one or more processors when retrieved from a non-transitory computer-readable medium, the program code including instructions to:

provide a graphical representation of the group of records, the graphical representation having a plurality of nodes and a plurality of edges, each node being associated with a record from the group of records and each edge being defined as a connection between two nodes, each edge symbolizing that the records associated with the two connected nodes are related;

associate a weight to each of the plurality of nodes, the weight being defined as equal to a number of edges connected to each node;

generate a first dense subset of records by:
selecting adding a first record associated with a first node based on the first node having a highest weight among the plurality of nodes; and adding a second record associated with a second node having a highest weight amongst nodes connected to the first node by an edge in the graphical representation;

identify a node from the graphical representation (1) that is associated with a record that is not part of the first dense subset and (2) has a highest weight among a group of nodes that are associated with a group of records outside of the records within the first dense subset;

determine a density of the identified node, the density being equal to a number of nodes associated with records in the first dense subset that are connected to the identified node divided by a total number of nodes associated with records within the first dense subset;

add the record associated with the identified node to the first dense subset of records when the density of the identified node satisfies a density threshold;

identify a duplicate record from the first dense subset of records using match rules to compare records within the first dense subset to each other; and remove the duplicate record from the first dense subset of records.

18. The computer program product of claim 17, the generating the first dense subset of records further comprising adding a plurality of records to the first dense subset, wherein each of the added plurality of records are associated with nodes connected to the first node.

19. The computer program product of claim 18, further comprising determining a density of a third node based on (a) a number of nodes that the third node is connected to in the first dense subset and (b) a total number of nodes in the first dense subset.

20. The computer program product of claim 19, wherein the third record is added to the first dense subset based on the third node having a highest weight and based on the density of the third node satisfying the density threshold, wherein the highest weight of the third node is determined excluding weights of nodes associated with records already in the first density subset.

21. The computer program product of claim 20, wherein the third record is not added to the first dense subset if addition of the third record causes a density of any node associated with the content of the first dense subset to decrease and fail the density threshold.

22. The computer program product of claim 21, wherein the density of one or more of the first node, second node and the third node is changeable based on the content of the first dense subset being updated.

23. The computer program product of claim 22, wherein addition of records into the first dense subset is completed based on finding no other node in the graphical representation having a density satisfying the density threshold.

24. The computer program product of claim 23, wherein the program code includes further instructions to:
- remove nodes associated with the content of the first dense subset from the graphical representation; and
- determine a second dense subset from the graphical representation after said removing of the nodes from the graphical representation.

* * * * *